United States Patent
Shetty et al.

(10) Patent No.: US 12,488,121 B2
(45) Date of Patent: Dec. 2, 2025

(54) SECURING WEB BROWSING ON A MANAGED USER DEVICE

(71) Applicant: Omnissa, LLC, Mountain View, CA (US)

(72) Inventors: Rohit Pradeep Shetty, Bangalore (IN); Ramanandan Nambannor Kunnath, Bangalore (IN); Kar-Fai Tse, Atlanta, GA (US); Sharun Varghese Samuel, Bangalore (IN); Tejas Thvar, Los Altos, CA (US)

(73) Assignee: Omnissa, LLC, Mountain View, CA (US)

( * ) Notice: Subject to any disclaimer, the term of this patent is extended or adjusted under 35 U.S.C. 154(b) by 423 days.

(21) Appl. No.: 17/726,574

(22) Filed: Apr. 22, 2022

(65) Prior Publication Data

US 2023/0237171 A1    Jul. 27, 2023

(30) Foreign Application Priority Data

Jan. 21, 2022   (IN) .............................. 202241003567

(51) Int. Cl.
    *G06F 21/60*    (2013.01)
(52) U.S. Cl.
    CPC ................................. *G06F 21/604* (2013.01)
(58) Field of Classification Search
    CPC .................................................. G06F 21/604
    See application file for complete search history.

(56) References Cited

U.S. PATENT DOCUMENTS

| | | | |
|---|---|---|---|
| 7,509,679 B2 * | 3/2009 | Alagna | G06F 21/56 726/24 |
| 8,850,050 B1 * | 9/2014 | Qureshi | G06F 21/6218 709/227 |
| 9,921,976 B2 | 3/2018 | Linga et al. | |
| 10,523,660 B1 | 12/2019 | Volkov et al. | |
| 11,088,993 B2 | 8/2021 | Wardell et al. | |
| 2014/0297861 A1 | 10/2014 | Qureshi | |

(Continued)

OTHER PUBLICATIONS

Non-Final Office Action mailed May 22, 2024 in U.S. Appl. No. 17/726,566, 9 pages.

(Continued)

*Primary Examiner* — William R Korzuch
*Assistant Examiner* — Forrest L Carey
(74) *Attorney, Agent, or Firm* — Kim & Stewart LLP

(57) ABSTRACT

Systems and methods are described for increasing web browser security on a user device managed by a device management system. In an example, the user device can use an unmanaged web browser to access secure enterprise content using a browser extension provided by the enterprise. When a user attempts to access secure content from an unmanaged browser, the device management system can communicate with the extension and a management application on the user device to authenticate the user and verify that the user device complies with certain policies. In one example, the device management system can include an extension recommendation engine that analyzes user browsing data and recommends browser extensions for the user. Based on policies, the device management system can recommend the extension to the user or force installation of the extension on the user device.

20 Claims, 7 Drawing Sheets

(56) References Cited

U.S. PATENT DOCUMENTS

| | | | |
|---|---|---|---|
| 2016/0094612 A1* | 3/2016 | Lockhart | G06F 16/9577 709/217 |
| 2016/0241599 A1 | 8/2016 | Qureshi | |
| 2018/0352002 A1 | 12/2018 | Ramachandran et al. | |
| 2020/0019414 A1* | 1/2020 | Byard | G06F 9/44526 |
| 2020/0050431 A1* | 2/2020 | Zilouchian Moghaddam | G06F 8/38 |
| 2021/0081486 A1* | 3/2021 | Mattox, Jr. | G06F 16/9577 |
| 2021/0126910 A1 | 4/2021 | Chauhan et al. | |
| 2021/0135869 A1 | 5/2021 | Barhudarian et al. | |
| 2021/0266306 A1 | 8/2021 | Furman et al. | |
| 2021/0336966 A1 | 10/2021 | Gujarathi et al. | |

OTHER PUBLICATIONS

Notice of Allowance mailed Sep. 27, 2024 in U.S. Appl. No. 17/726,566, 10 pages.

Non-Final Office Action mailed Mar. 27, 2025 in U.S. Appl. No. 17/726,592, 23 pages.

* cited by examiner

SECURING WEB BROWSING ON A MANAGED USER DEVICE

RELATED APPLICATIONS

Benefit is claimed under 35 U.S.C. 119(a)-(d) to Foreign Application Serial No. 202241003567 filed in India entitled "SECURING WEB BROWSING ON A MANAGED USER DEVICE", on Jan. 21, 2022, by VMware, Inc., which is herein incorporated in its entirety by reference for all purposes.

The present application is related in subject matter to U.S. patent application Ser. No. 17/726,566, U.S. patent application Ser. No. 17/726,592 which is incorporated herein by reference.

BACKGROUND

Enterprise users access their corporate resources from various devices. For example, enterprise users can have a smart phone, a computer, and a tablet for use in the work environment. Some enterprises allow users to use their own personal devices.

Enterprises use various methods to secure their content and networks with all the devices their employees use. For example, to verify user access, an enterprise can toggle between different authentication modes, such as two-factor authentication, prompting the user to answer security questions, or requiring the user to enter a temporary token like an RSA token. Some enterprises protect resources by restricting access to only devices that are enrolled in a device management system, such as a Unified Endpoint Management ("UEM") system. Such devices can be checked for compliance with UEM policies. Enterprises can also require that the users access the resources through an application managed by the UEM system.

One problem with current methods of securing enterprise content is that users is that current systems can leave users unable to use their preferred applications. For example, some users may prefer to use a third-party web browser to access an online application as opposed to a managed web browser provided by the UEM system. This is because currently there is no way for the UEM system to determine whether a user device is enrolled when a third-party browser is used. As a result, the UEM system is unable to determine whether the user device is secure.

Also, some users practice poor browsing hygiene, which can compromise the security of their device or slow down their device. For example, users can visit websites that use tracking software, leave a large number of tabs open on their browser, or connect to unsecure networks. Web browsers today offer extensions that can help secure browsing habits and reduce resource waste. However, many users are unaware of these extensions, and if they are, they do not know which ones to use.

As a result, a need exists for allowing access to secure enterprise content using a third-party web browser. Additionally, a need exists for identifying and recommending extensions to users that would be beneficial based on their browsing habits.

SUMMARY

Examples described herein include systems and methods for providing secure browsing on a managed user device. The user device can be managed by a UEM system or other system that manages user devices. For example, an enterprise organization can utilize the UEM system to manage and secure user devices that operate within the enterprise network and access secure content.

In an example, a user can request access to enterprise data and resources (hereinafter referred to as "secure content"), from a web browser on the user device that is not managed by the UEM system. The secure content can include any type of data or services related to an enterprise or otherwise considered confidential in some respect. Although the web browser is not managed, the browser can have a UEM extension installed that is provided by the UEM system. In an example, the request can be a Hypertext Transfer Protocol ("HTTP") request that directs the user device to a content server in the UEM system that hosts the secure content. The content server can redirect the user device to an identity manager in the UEM system that manages access to secure content. In an example, the identity manager can authenticate the user. For example, the identity manager can send a Hypertext Markup Language ("HTML") file that causes the browser to display a web page prompting the user to input credentials. The user can input the credentials, which the browser can send to the identity manager, and the identity manager can authenticate the credentials.

In an example, after authenticating the user, the identity manager can retrieve access policies related to the secure content. Based on those policies, the identity manger can determine whether further authentication is required by the UEM system. For example, access to some secure content can require that the user device be compliant with UEM policies, that the web browser be secure, and so on. In an example, based on the policies, the identity manager can generate a time-based pseudorandom token and send the token to a management server in the UEM system. As will be described later below, the user device can later send the same temporary token to the management server for verification. In an example, the management server can send a UEM session token to the identity manager, and the identity manager can send the UEM session token and temporary token to UEM extension on the browser. The user device can be configured with a management application that enforces management instructions on the user device from the management server. The UEM session token can be a security token generated in the UEM system that the management application can recognize and validate, thereby adding another layer of security.

In an example, the identity manager can encrypt the tokens using a security key that the UEM extension can use to decrypt. As an example, the identity manager can encrypt the tokens using a public key generated and provided by the UEM extension, and the UEM extension can decrypt the tokens using the corresponding private key. In an example, the UEM extension can pass the tokens to the management application, and the management application can validate the UEM session token. In one example, the management application can prompt the user for a passcode, such as a Single-Sign On ("SSO") code, a Personal Identification Number ("PIN"), or PIN Based Encryption ("PBE") code. This can add another security layer.

In an example, if the user enters the correct passcode, the management application can send the UEM session token, the temporary token, and a user session token to the management server. The user session token can refer to a token provided by the management application that is verifiable by the management server. This token can be provided to the management application when the user device enrolls in the UEM system, as an example. In one example, the management application can also verify that the user device is compliant with UEM policies and notify the management server of such.

In an example, the management server can verify that the user device is compliant and verify the three keys. If all this is successful, then the management server can notify the identity manager. The identity manager can authorize access to the secure content and redirect the browser to the secure content. In one example, identity manager can send the temporary token to the content server, and the UEM extension can provide the same temporary token to the content server to verify that the user device is authorized to access the secure content.

In an example, the UEM system can include an extension recommendation engine ("ERE") that can recommend browser extensions for users that can increase browsing security. In one example, the ERE can gather data from various sources and compare the data to policies that designate certain extensions when certain conditions are met. The policies can also designate whether an extension is required or optional.

In one example, the management application can collect data for the ERE related to the user device's network connections and location, such as the types of networks the user connects to and where the user connects to the UEM system. In another example, the UEM extension can collect data related to a user's browsing habits, such as the types of websites the user tends to visit and the number of tabs the user typically has open in the browser. In another example where the user uses a browser managed by the UEM system, a forward proxy in the managed browser can be used to collect data on the user's browsing habits. In another example, the ERE can retrieve data about groups the user belongs to or a risk profile associated with the user.

In an example, the ERE can recommend extensions based on the user browsing data. For example, if a user typically has more than a predetermined number of tabs open in the browser, then the ERE can recommend an extension that reduces random-access memory ("RAM") utilization by disabling unused tabs. In another example, if a user tends to visit the type of website known for tracking browsing patterns, such as shopping websites, then the ERE can recommend an extension that prevents tracking. In another example, if a user tends to visit websites with heavy advertisements, such as sports websites or blogs, then the ERE can recommend an ad blocking extension. In another example, if a user connects to unsecure public networks, then the ERE can recommend an extension that secures all HTTP communications.

In some examples, the ERE can recommend extensions based on a group the user belongs to. For example, an admin of a particular group in an organization can require that all users of the group have a certain extension installed on their browsers. In another example, the ERE can identify extensions that a large portion of users of the same group use, and the ERE can recommend that extension to any users in the group not using the extension. In another example, the ERE can identify users in an organization that use the same extensions as a certain user, and if a large portion of those users also use another extension not being used by the user, then the ERE can recommend that extension to the user.

In an example, a management server in the UEM system can act on the ERE's recommendations based on the policies. For example, if a policy states that an extension is not mandatory, then the management server can send a notification or message to the user identifying the recommendation and stating why the extension is recommended. In an example where the extension is required, the management server can send to the user device an install file or a Uniform Resource Locator ("URL") for downloading the install file. The file or URL can be sent to the management application, the UEM extension, or the browser, depending on the example. In one example, the management server can send instructions to the management application to block internet access on the user device unless the mandatory extension is installed.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for increasing web browser security on a user device managed by a device management system. In an example, the user device can use an unmanaged web browser to access secure enterprise content using a browser extension provided by the enterprise. When a user attempts to access secure content from an unmanaged browser, the device management system can communicate with the extension and a management application on the user device to authenticate the user and verify that the user device complies with certain policies. In one example, the device management system can include an extension recommendation engine that analyzes user browsing data and recommends browser extensions for the user. Based on policies, the device management system can recommend the extension to the user or force installation of the extension on the user device FIG. 1 is an illustration of an example system for providing secure web browsing on a managed user device.

Figure 2:
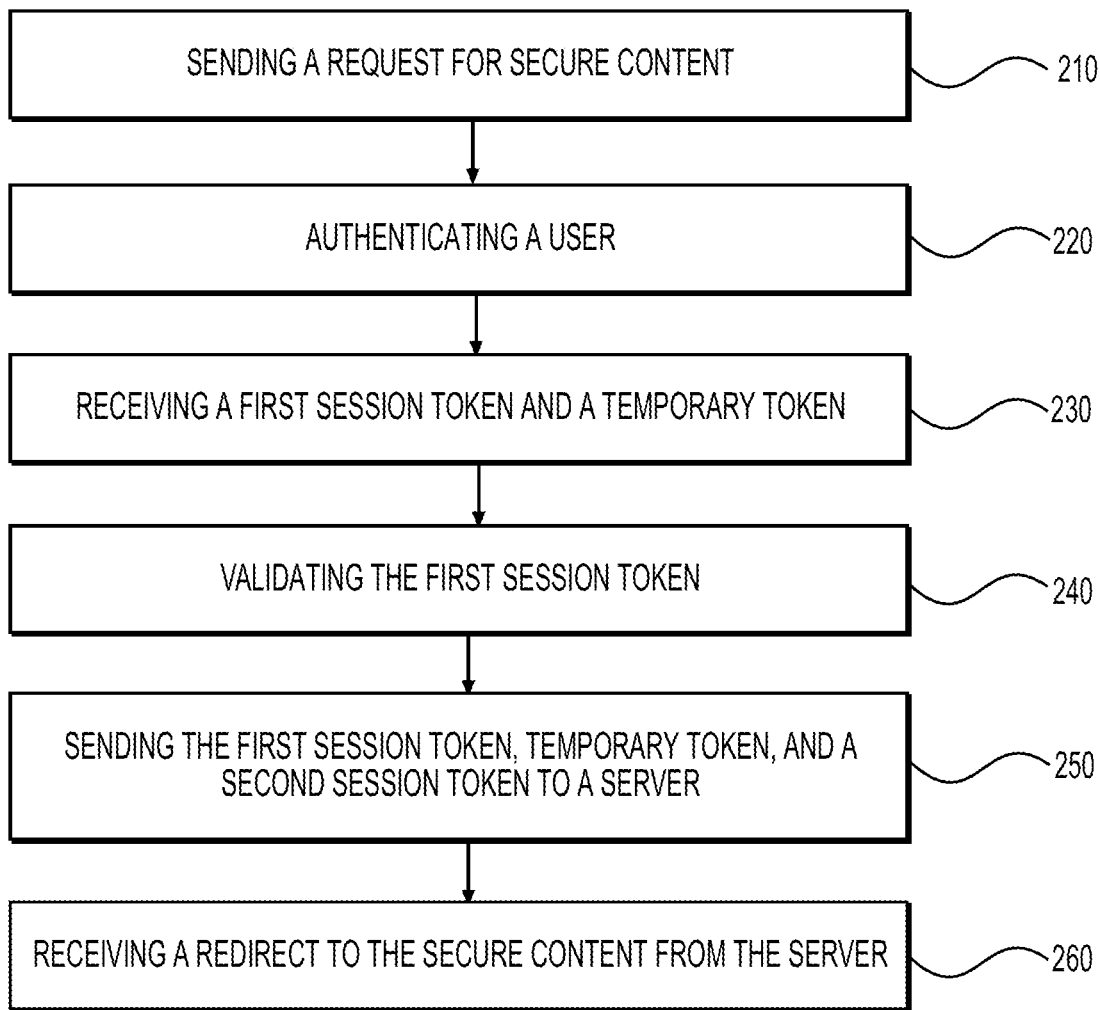
FIG. 2 is a flowchart of an example method for accessing secure content from an unmanaged web browser.
Figure 3:
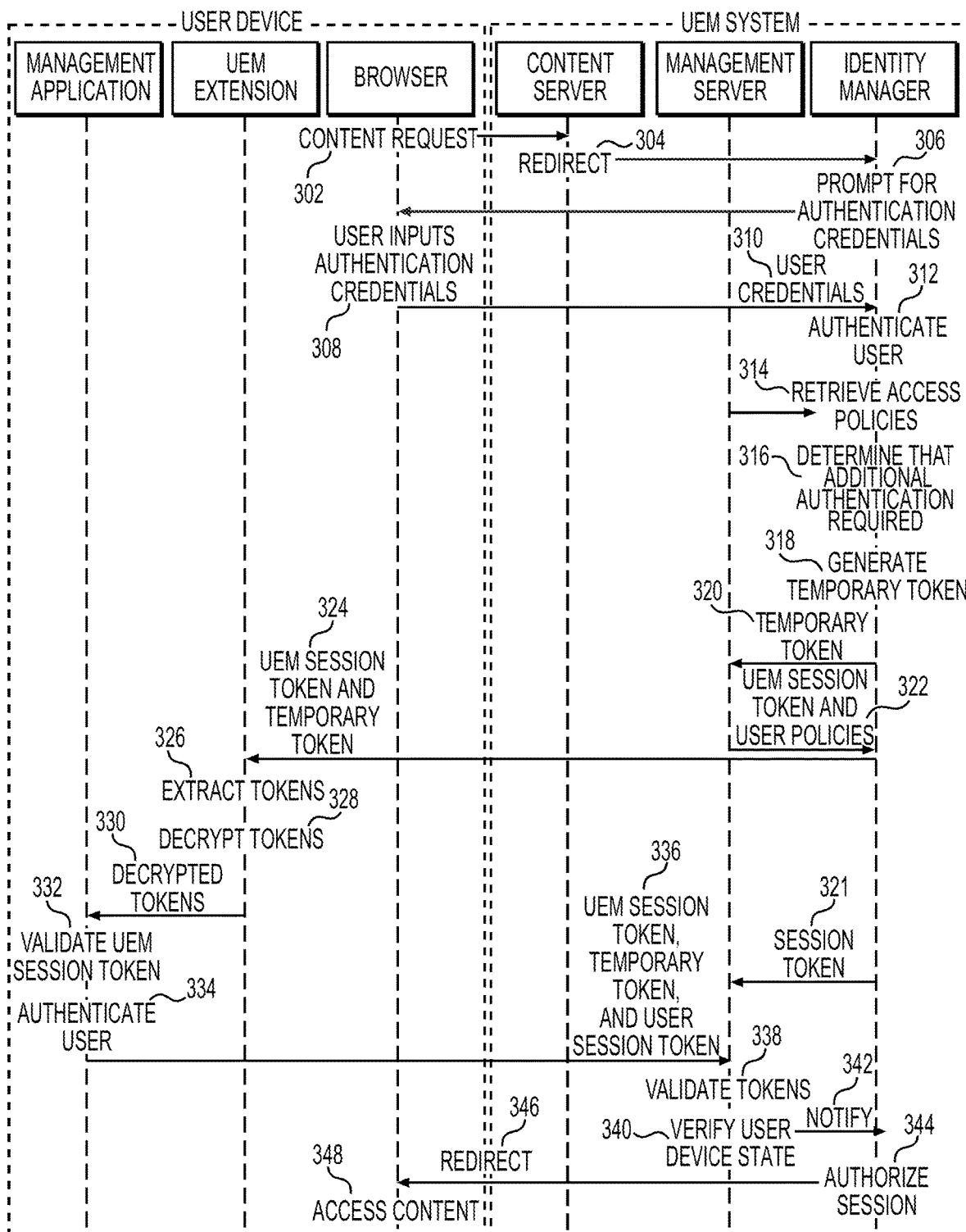
FIG. 3 is a sequence diagram of an example method for accessing secure content from an unmanaged web browser
Figure 4:
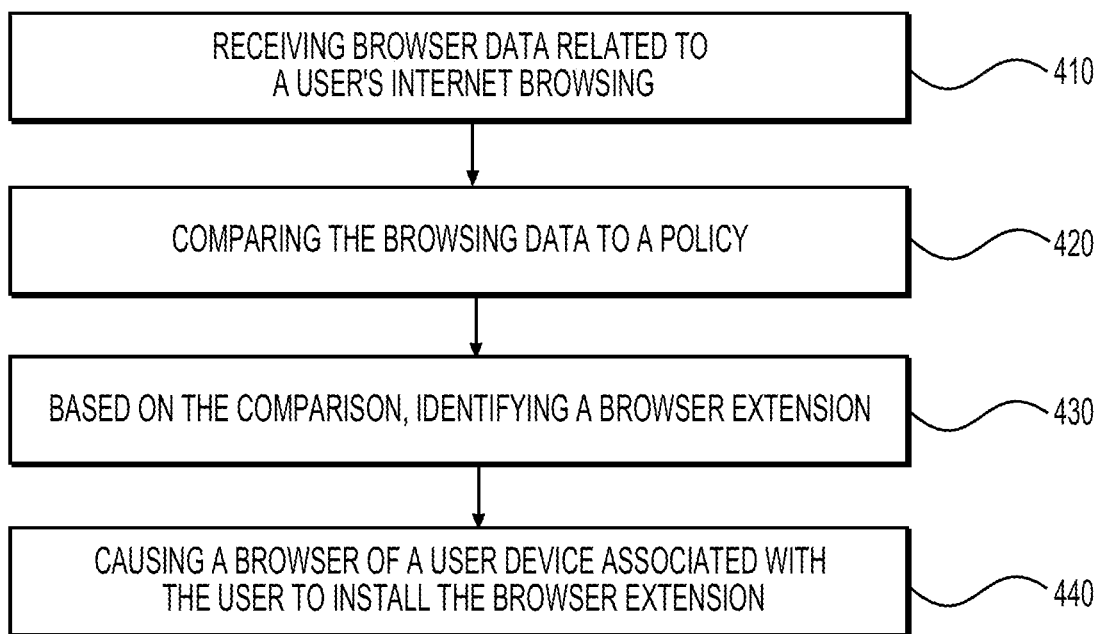
FIG. 4 is a flowchart of an example method for installing a recommended browser extension based on user behavior.
Figure 5:
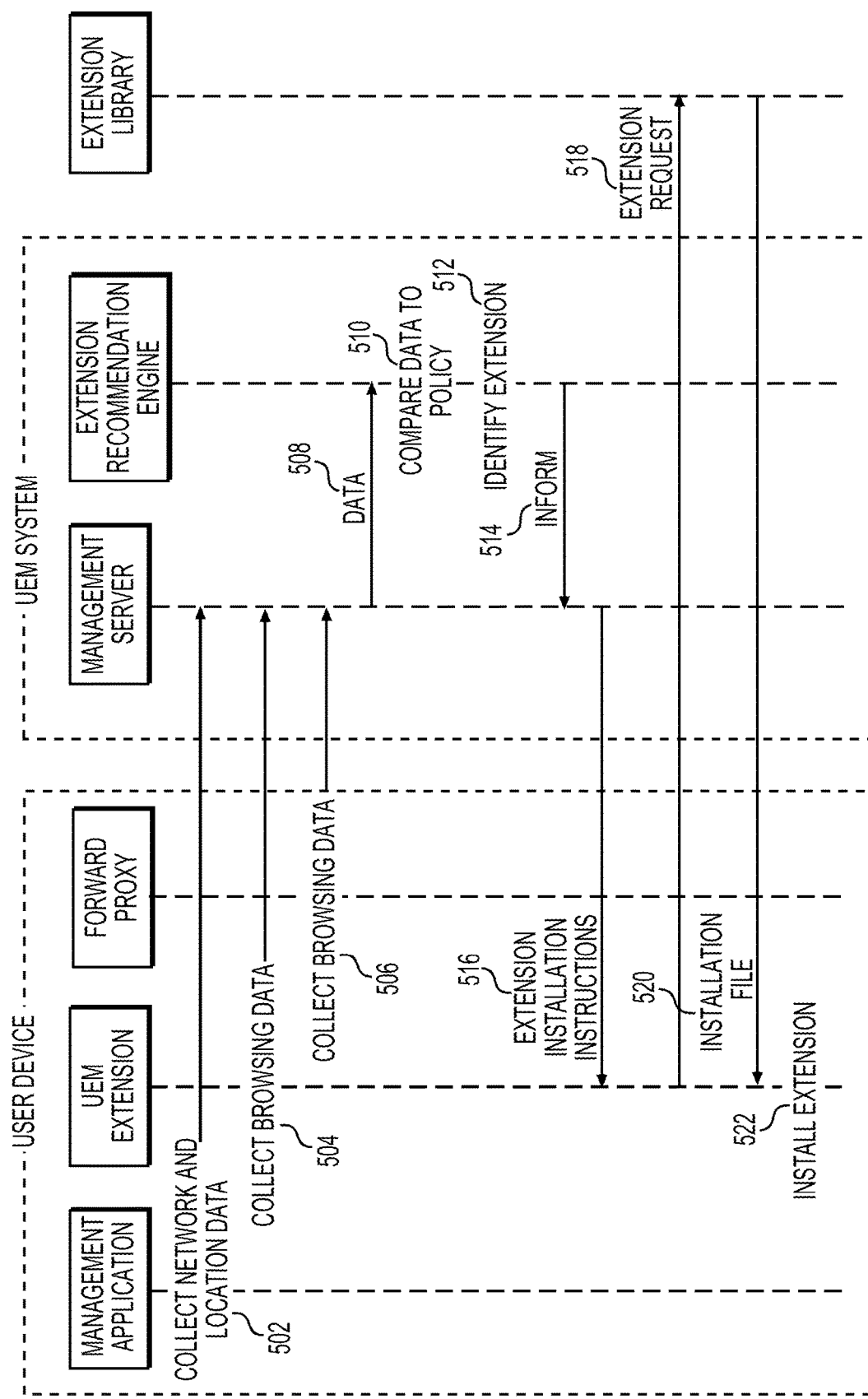
FIG. 5 is a sequence diagram of an example method for installing a recommended browser extension based on user behavior.

FIGS. 2 and 3 are a flowchart and sequence diagram, respectively, of example methods for accessing secure content from an unmanaged web browser using a browser extension provided by a UEM system or other device management system. FIGS. 4 and 5 are a flowchart and sequence diagram, respectively, of example methods for recommending browser extensions for a user based on the user's browsing history, user device state, groups, and other factors.

Figure 1:
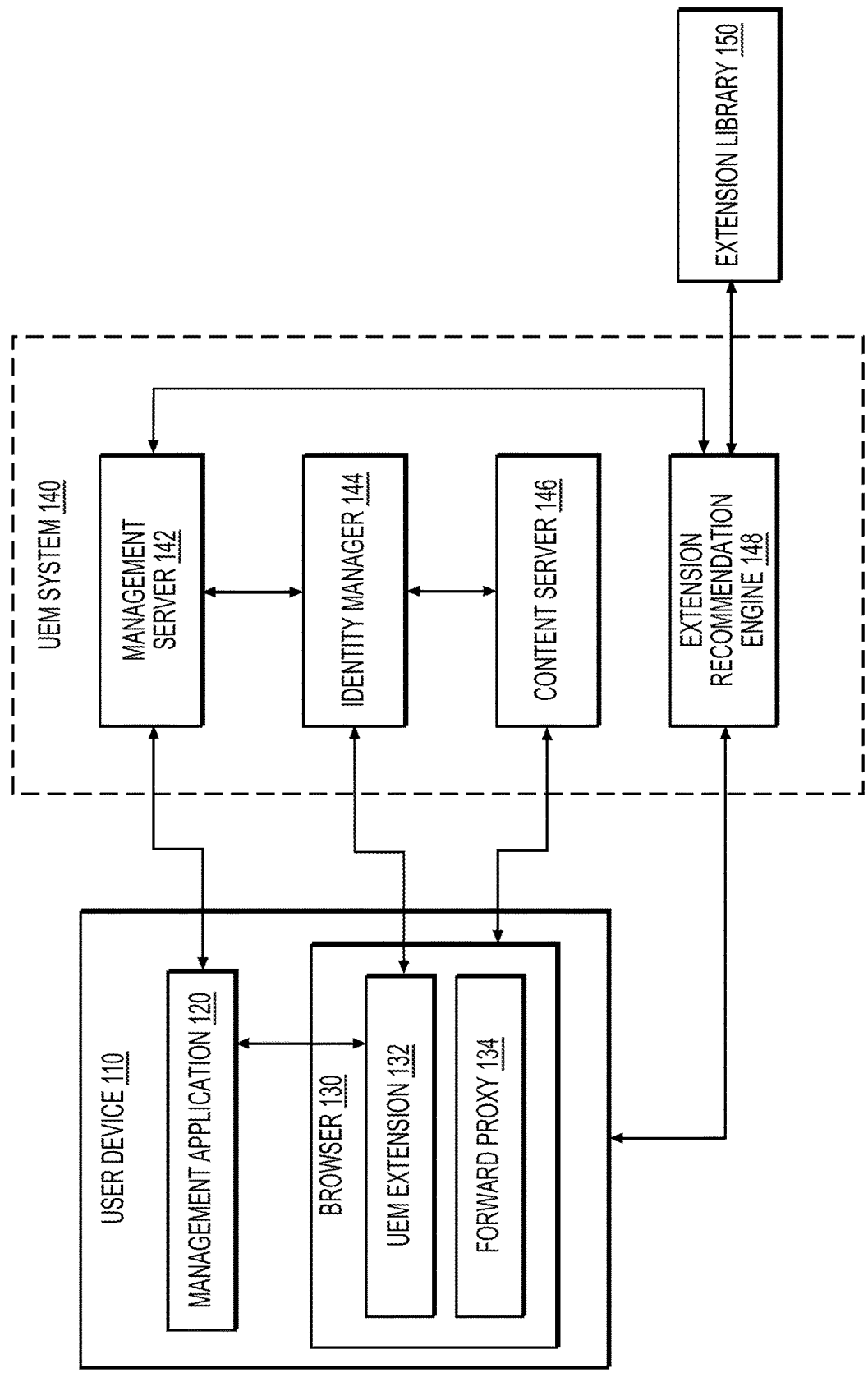
FIG. 1 is an illustration of an example system for providing secure web browsing on a managed user device.

FIG. 1 is an illustration of an example system for providing secure web browsing on a managed user device. The example system can include a user device 110 that belongs to or is assigned to a user. The user device 110 can be one or more processor-based devices, such as a personal computer, tablet, or cell phone. In an example, the user device 110 can be enrolled in a UEM system 140, which can be any system for managing a group of user devices.

In an example, the UEM system 140 can manage the user device 110 through a management server 142. The management server 142 can be a single server or a group of servers, including multiple servers implemented virtually across multiple computing platforms, including a cloud-based platform. In an example, the management server 142 can manage the user device 110, and other enrolled user devices, by sending management instructions to a management application 120 installed on the user device 110 during or prior to enrolling. The management application 120 can be a stand-alone application, part of an enterprise application, or part of an operating system of the user device 110. In one example, the management application 120 can communicate with the management server 140 using Application Programming Interface ("API") calls.

In an example, the management application 120 can be responsible for ensuring that the user device 110 is up to date with compliance and security settings prior to secure content, which can include any type of data or services related to an enterprise or otherwise considered confidential in some respect. The management application 120 can communicate with the UEM server 142 (alternatively called management server 142), allowing UEM management of the user device 110 based on compliance and security settings at the UEM server 142. The management application 120 can enforce compliance at the user device 110, such as by locking a device, notifying an admin, or wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain secure content. In one example, the user device 110 can secure content through the UEM server 142.

In an example, the user device 110 can include a browser 130, which can be any kind of application that provides a user interface ("UI") for accessing the Internet. Some examples can include GOOGLE CHROME, MICROSOFT EDGE, APPLE SAFARI, and MOZILLA FIREFOX, to name a few. In one example, the browser 130 can be a browser that is not managed by the UEM system 140, which can mean that the UEM system 140 does not have control over access and functionality of the browser 130.

In an example, the unmanaged browser 130 can include a UEM extension 132 that can help enforce secure browsing and allow the user device 110 to access secure content. The UEM extension 132 can be a software module, such as a plugin, provided by the UEM system 140 that enables custom functionality on a web browser. For example, the UEM extension 132 can modify the UI, manage cookies, execute custom scripting and styling, and perform other functions described later herein. In one example, the UEM extension 132 can help facilitate communications between the management application 120 and components of the UEM system 140 to authenticate the user and verify the state of the user device 110 when the user attempts to access secure content through the browser 130. For example, the UEM extension 132 can receive and interpret HTTP communications from servers and services in the UEM system 140 and pass corresponding information to the management application 120, such as instructions and security tokens received through the browser 130.

In an example, the UEM system 140 can include one or more content servers 146 that host content for an enterprise. Each content server 146 can provide a particular resource or application associated with the enterprise. Although the UEM system 140 can include multiple content servers 146, for simplicity these servers are referred to as the content server 146. The content server 146 can single server or a group of servers, including multiple servers implemented virtually across multiple computing platforms, including a cloud-based platform. In an example, if the content server 146 hosts secure content from the browser 130, the content server 146 can be configured to redirect the browser 130 to an identity manager 144. The identity manager 144 can be a server, or service on a server, that authenticates identities of entities attempting to access secure content. The identity manager 144 can verify credentials, generate and verify security tokens, and instruct other servers and devices when an entity can or cannot access portions of the UEM system 140.

In an example, the UEM system 140 can include an ERE 148 that can further increase browsing security of enrolled user devices. The ERE 148 can collect various data points related to the user's browsing habits and the user device 110 and provide suggestions for browser extensions for improving and securing the user's Internet browsing. Some examples can include browsing patterns, the location of the user device 110, any groups the user belongs to, extensions used by other users in the same group as the user, a risk profile associated with the user, and more. In one example, the management application 120 can collect and send data related to the user device 110 to the ERE 148, and the UEM extension 132 and a forward proxy 134 can collect and send data related to the user's Internet browsing to the ERE 148. The forward proxy 134 can execute as a proxy server on the user device 110.

In some examples, the browser 130 can be a managed browser 130. In other words, the managed browser can be provided by the UEM system 140 and allow an enterprise to control access and functionality of the browser 130. If the browser is a managed browser 130, then the browser 130 can be configured with the forward proxy 134, and the forward proxy 134 can collect data on the user's browsing habits and send the data to the ERE 148. On the other hand, if the browser 130 is unmanaged, then the browser 130 can include the UEM extension 132, and the UEM extension 132 can collect the data and send it to the ERE 148. The system illustrated in FIG. 1 shows a single browser 130, as most users use a single browser on their user devices. References herein made to the unmanaged browser 130 or a browser 130 with the UEM extension 132 can be understood as referring to a web browser that is not managed by the UEM system 140. Likewise, references herein made to the managed browser 130 or a browser with the forward proxy 134 can be understood as referring to a web browser that is managed by the UEM system 140.

In an example, the ERE 148 can user various methods in identifying recommended browser extension. As some examples, the ERE 148 can recommend extensions based on policies, statistics, and the application of machine learning ("ML") models. Some recommendations can be suggested to the user while other can be required. As an example, for a required extension, the management server 142 can instruct the managed browser 130 or UEM extension 132 to install the recommended extension. In one example, if the browser 130 does not have a certain recommended extension installed, the UEM extension 132 or managed browser 130 can deny the user access to any UEM related content. In one example, the ERE 148 can access an extension library 150 when identifying extensions to recommend. The extension library 150 can be an internal library within the UEM system 140 or from a third-party, depending on the example. Third-party extension libraries 150 can be associated with the browser being used on the user device 110. For example, GOOGLE CHROME, MICROSOFT EDGE, APPLE SAFARI, and MOZILLA FIREFOX all have their own extension library for their corresponding browsers.

FIG. 2 is a flowchart of an example method for accessing secure content in the UEM system 140 from the unmanaged browser 130. The unmanaged browser 130 in this example method can include the UEM extension 132. At stage 210, the user device 110 can send a request to the content server 146. For example, the browser 130 can send an HTTP request to the content server 146 using a URL provided by the user. The content server 146 can be configured to respond to an HTTP request based on whether the browser 130 is managed or unmanaged. For example, if the content server 146 recognizes the browser 130 as a managed browser, then the content server 146 can allow the user to access the secure content. In one example where the browser 130 is a secure browser, the secure browser 130 can provide a security token and the content server 146 can verify with the identity manager 144. In examples where the browser 130 is unmanaged, the content server 146 can be configured to redirect the browser 130 to the identity manager 144 for verification.

At stage 220, the user device 110 can authenticate the user. For example, the content server 146 can respond to the browser 130 with a redirect URL that causes the browser 130 to send an HTTP request to the identity manager 144. In an example, the identity manager 144 can respond by sending instructions to the browser 130 to prompt the user for authentication credentials. For example, the identity manager 144 can send an HTML file that causes the browser 130 to display a web page with a login prompt. The user can input his or her credentials, which the browser 130 can send to the identity manager 144.

In an example, after authenticating the user, the identity manager 144 can retrieve policies from the management server 142 to determine whether the requested content requires additional verification. For example, the UEM system 140 can include multiple security levels for enterprise content. The UEM system 140 can allow access to some content based on the user providing accurate credentials. For more secure content, the UEM system 140 can require additional security measures, which is described in below.

In an example, the identity manager 144 can determine that access to the requested secure content require additional verification. In response, the identity manager 144 can generate a temporary security token (hereinafter referred to as a "temporary token"). The temporary token can be a time-based pseudorandom token that expires after a predetermined amount of time. For example, the temporary token can expire after 1 minute or 5 minutes so that the temporary token cannot be used on other attempts to access secure content. In one example, the identity manager can send the temporary token to the management server 142. The management server 142 can use the temporary token to verify the user device 110, which is described later herein.

In an example, the identity manager 144 can verify that the UEM extension 132 is installed on the browser 130. If not, the identity manager 144 can deny the browser 130 access to the secure content. If the UEM extension 132 is present, the identity manager 144 can encrypt the temporary token and a UEM session token, and then transfer the two tokens to the UEM extension 132. The UEM session token can be a security token generated in the UEM system 140 that the management application 120 can recognize and validate, thereby adding another layer of security. For example, the UEM session token can be created by the management server 142 and passed to the identity manager 144. In one example, the management application 130 can be provided with a security key for decrypting the UEM session token during or after enrollment.

At stage 230, the user device 110 can receive the UEM session token and temporary token from the identity manager 144. In an example, the identity manager 144 can encrypt the tokens and send them to the browser 130 using an HTTP call. The tokens can be sent as one or more data files, such as an HTML or JavaScript Object Notation ("JSON") file. In one example, the data file can include a flag value that causes the UEM extension 132 to handle the data file before any web page is rendered on the browser 130. The UEM extension 132 can be configured with one or more security keys for decrypting the tokens. After receiving the response from the identity manager 144, the UEM extension 132 can extract the tokens and decrypt them using the security keys. Alternatively, the UEM extension 132 can pass the encrypted tokens to the management application 120, and the management application 120 can decrypt the tokens. In one example, the UEM extension 132 can also delete any HTML or JavaScript ("JS") snippets in the response from the identity manager 144 that correspond to secure code.

At stage 240, the user device 110 can validate the UEM session token. In an example, the UEM extension 132 can pass the tokens to the management application 120 for validation. In one example, the UEM extension 143 can pass the token to the management application 120 using deep linking, such as IOS UNIVERSAL LINKS or an intent URL on an ANDROID device. The management application 120 can then validate that the UEM session token came from a trusted source within the UEM system 140.

In an example, the management application 120 prompt the user to enter a secure passcode on the user device 110, such as an SSO, PIN, or PBE. If the user provides the correct passcode, the management application 120 can verify the security posture of the user device 110. For example, the management application 130 can verify that the user device 110 complies with all the UEM policies required to access the secure content. In one example, the response from the identity manager 144 can include policies that the user device 110 must comply with, and the management application 120 can compare the security posture of the user device 110 to those policies. This can be a requirement from the UEM system 140 for accessing certain levels of secure content.

At stage 250, the user device 110 can send the UEM session token, the temporary token, and a user session token to the management server 142. In an example, the user session token can refer to a token provided by the management application 120 that is verifiable by the UEM system 130. For example, the user session token can be provided to the management application 120 during or after enrollment from the management server 142. In one example, the management application 120 can encrypt the tokens using a public key provided by the management server 142. The management server 142 can decrypt the tokens using a corresponding private key. The management server 142 can verify that the UEM session token is the same token previously given to the identity manager 144, that the user session token originated from a trusted user device, and that the temporary token received from the user device 110 matches the temporary token received from the identity manager 144. In one example, the management server 142 can also verify that the temporary token has not expired.

In an example, the management application 120 can send information related to the device state of the user device 110 to the management server 142. As an example, the device state information can include information about the user device's 110 compliance with UEM policies, the security status of the user device's 110 network connection, and so on. The management application 120 can verify that the user device 110 is compliant with access policies associated with the secure content. In one example, the management application 120 can also send information related to the browser 130. For example, the UEM system 140 can restrict access to the secure content to web browsers that meet minimum qualifications. For example, the management server 142 can whitelist certain web browsers, blacklist certain web browsers, or block unknown browsers. In one example, the management server 142 can verify that the browser 130 meets certain version requirements. For example, for each known web browser, the UEM system 140 can designate a version or range of versions that can access the secure content. In on example, this information can be provided by an administrator ("admin") using an admin console.

At stage 260, the user device 110 can receive a redirect to the secure content from the identity manager 144. For example, after verifying the state of the user device 110 and validating the tokens, the management server 142 can notify the identity manager 144 that the tokens were validated and that the user device 110 is compliant. In response, the identity manager 144 can authorize the user device 110 to access the secure content. The identity manager 144 can then send a redirect URL to the browser 130 that the browser 130 can use to access the secure content. In examples where the management server 142 cannot verify the tokens or the user device 110 is not compliant, the identity manager 144 can instead notify the user device 110 that access to the secure content has been denied. As an example, the identity manager 144 can send an HTML data file to the browser 130 that causes the browser 130 to display a web page informing the user that access has been denied.

FIG. 3 is a sequence diagram of an example method for accessing secure content from an unmanaged web browser 130. The unmanaged browser 130 in this example method can include the UEM extension 132. At stage 302, the browser 130 can send a request for secure content to the content server 146. For example, the browser 130 can send an HTTP request to the content server 146 using a URL provided by the user.

At stage 304, the content server 146 can redirect the browser 130 to the identify manager 144. In an example, the content server 146 can be configured to redirect HTTP requests from unmanaged browsers. In one example, the HTTP request can include information identifying the browser used to make the request. Alternatively, the content server 146 can respond to the browser 130 by requesting information about the browser 130. In one example, the response can include a flag value that the UEM extension 132 can recognize. In response to the flag value, the UEM extension 132 can be configured to cause the browser 130 to send certain information about the browser 130, such as the browser's name and version. In an example, in response to determining that the browser 130 is not managed by the UEM system 140, the content server 146 can send a redirect URL that causes the browser 130 to send an HTTP request to the identity manager 144.

At stage 306, the identity manager 144 can instruct the browser 130 to prompt the user for credentials. For example, the identity manager 144 can send a HTML file that causes the browser 130 to display a web page with a login prompt. At stage 308, the user can input credentials into the browser 130, which the browser 130 can send to the identity manager 144 at stage 310. In one example, the communications between the browser 130 and the identity manager 144 can be protected with end-to-end encryption.

At stage 312, the identity manager 144 can authenticate the credentials. For example, the identity manager 144 can decrypt the credentials and compare them to a credentials database in the UEM system 140 that the identity manager 144 can access. If the credentials match, at stage 314, the identity manager 144 can retrieve access policies associated with the secure content from the management server 142. For example, the UEM system 140 can include multiple security levels for enterprise content. The UEM system 140 can allow access to some content based on the user providing accurate credentials. For more secure content, the UEM system 140 can require additional security measures, such as ensuring that the device posture of the requesting user device is compliant, allowing only certain versions of browsers, and utilizing the UEM extension 132 for token verification. In one example, the access policies can be specific to the user. For example, the access policies can indicate whether the user can access the secure content or whether the user can use the unsecured browser 130 to access the secure content. At stage 316, the identity manager 144 can determine that access to the secure content requires additional verification. This can be based on the access policies, for example.

At stage 318, the identity manager 144 can generate a temporary token. The temporary token can be a time-based pseudorandom token that expires after a predetermined amount of time so that the temporary token cannot be used on other attempts to access secure content. At stage 320, the identity manager 144 can send the temporary token to the management server 142.

At stage 322, the management server 142 can send a UEM session token to the identity manager 144. The UEM session token can be a security token generated in the management server 142 that the management application 120 can recognize and validate, thereby adding another layer of security. In one example, the management application 130 can be provided with a security key for decrypting the UEM session token during or after enrollment. As an example, each enrolled user device in the UEM system 140 can be configured with an encrypted key pair. Each enrolled user device can possess a private key and the UEM system 140 can store a copy of each corresponding public key. The UEM system can encrypt communications with each user device using their corresponding public key. In an example, the management server 142 can encrypt the UEM session key using the public key that corresponds to the user device 110 so that only the management application 120 on the user device 110 can decrypt the UEM session key.

At stage 324, the identity manager 144 can send the UEM session token and the temporary token to the UEM extension 132. In one example, the identity manager 144 can send the tokens to the browser 130 in an encrypted data file, such as an HTML or JSON file, that the browser 130 cannot decrypt. However, the UEM extension 132 can have the necessary key for decrypting the data file. In one example, the data file can include a flag value that can indicate to the UEM extension 132 that it should handle the data file.

At stage 326, the UEM extension 132 can extract the tokens. For example, the UEM extension can extract the UEM session token and temporary token from the data file and delete any HTML or JS snippets in the data file that correspond to secure code. At stage 328, the UEM extension 132 can decrypt the tokens, and, at stage 330, the UEM extension 132 can send the decrypted tokens to the management application 120.

At stage 332, the management application 120 can validate the UEM session token. In one example, the UEM extension 143 can pass the token to the management application 120 using deep linking, such as IOS UNIVERSAL LINKS or an intent URL on an ANDROID device. The management application 120 can then validate that the UEM session token came from a trusted source within the UEM system 140.

At stage 334, the management application 120 can authenticate the user. For example, the management application 120 prompt the user to enter a secure passcode on the user device 110, such as a SSO, PIN, or PINBE. In an example, if the user provides the correct passcode, then the management application 120 can verify the security posture of the user device 110. For example, the management application 130 can verify that the user device 110 complies with all the UEM policies required to access the secure content. Such policies can be based on the user device's 110 compliance with UEM policies, and the security status of the user device's 110 network connection, for example. The UEM system 140 can also restrict access based on the unmanaged browser used and whether the unmanaged browser is an allowed version. For example, for each known unmanaged web browser, the UEM system 140 can designate a version or range of versions that can access the secure content. In one example, the data file from the identity manager 144 can include the policies that the user device 110 must comply with, and the management application 120 can compare the security posture of the user device 110 to those policies.

At stage 336, the management application 120 can send the UEM session token, temporary token, and a user session token to the management server 142. In an example, the user session token can refer to a token provided by the management application 120 that is verifiable by the UEM system 130. For example, the user session token can be provided to the management application 120 during or after enrollment from the management server 142. In one example, the management application 120 can encrypt the tokens using a public key provided by the management server 142. The management server 142 can decrypt the tokens using a corresponding private key.

At stage 338, the management server 142 can validate the tokens. For example, the management server 142 can verify that the UEM session token is the same token previously given to the identity manager 144, that the user session token matches a user session token associated with the user device 110, and that the temporary token received from the user device 110 matches the temporary token received from the identity manager 144. In one example, the management server 142 can also verify that the temporary token has not expired.

At stage 340, the management server 142 can verify the state of the user device 110. In one example, the management application 120 can notify the management server 142 whether the device posture of the user device 110 is compliant with the access policies. This can be based on the analysis of the user device 110 state, for example. In an alternative example, the management application 120 can send information about the user device 110 posture and the management server 142 can make the determination of whether the user device 110 is compliant.

At stage 342, the management server 142 can notify the identity manager 144 that the tokens and state of the user device 110 are verified. In response, at stage 344, the identity manager 144 can authorize the browser 130 to access the secure content. Then, at stage 346, the identity manager 144 can redirect the browser 130 to the secure content. For example, the identity manager 144 can send a redirect URL to the browser 130 that the browser 130 can use to access the secure content at stage 348. In another example, the identity manager 144 can notify the content server 146 that the browser 130 is authorized to access the secure content. In one example, the identity manager 144 can send the temporary token to the content server 146, and the browser 130 can access the secure content by sending the temporary token to the content server 146.

FIG. 4 is a flowchart of an example method for installing a recommended browser extension. At stage 410, the ERE 148 can receive browsing data related to the user and their browsing habits. In one example, the browsing data can include the types of websites the user tends to visit, particularly websites not associated with the enterprise. Some examples can include shopping sites, sports sites, social media sites, and any unsecure websites. In another example, the browsing data can include how many tabs the user tends to have open, which can waste a large portion of memory, such as RAM, on the user device 110. In another example, the browsing data can include information related to the user's location and the types of networks the user device 110 connects to. This can include, for example, how often the user connects to internal networks of the UEM system 140 versus external networks and the security protocols used by the external networks. In another example, the browsing data can include information related to any groups in the enterprise that the user belongs to. For example, the ERE 148 can recommend browser extensions for certain groups. In another example, the browsing data can include a risk profile created for the user. In another example, the browsing data can identify UEM-managed applications that the user frequently uses.

The ERE 148 can receive the user browsing data from one or more sources associated with the UEM system 140. For example, if the user uses a managed browser 130, then the managed browser 130 can collect the data and send it to the ERE 148. In another example where the user uses a managed browser 130, then the forward proxy 134 configured on the managed browser 130 can collect the data. In an example where the user uses an unmanaged browser 130, then the UEM extension 132 can gather the data. Some data associated with the user, such as designated groups and risk profiles, can be collected from a database or server in the UEM system 140. In one example, data related to the user device's 110 location and network connections can be collected by the management application 120.

At stage 420, the ERE 148 can compare the browsing data to one or more policies. The policies can include a set of parameters for determining whether a browser extension should be recommended. Some examples of parameters can include a maximum number of tabs open on a browser, a maximum rate of visits to websites with trackers, and minimum security requirements for connections to public networks. The ERE 148 can compare the browsing data and policies in different ways, depending on the data. For example, some policies can require that a certain extension be installed for certain users, and the ERE 148 can simply compare the user to the policy and determine whether the required extension is installed. In another example, the ERE 148 can perform a statistical analysis on the browsing data. For example, the ERE 148 can determine how frequently a user visits a particular website or type of website, how many tabs the user typically has open in the browser 130 when the browser 130 is open, and a maximum the user connects using an unsecure network, and how much time the user spends using a particular web application. This statistical data can then be compared to the policies.

In an example, if the user browsing data satisfies the parameters of a policy, the ERE 148 can recommend a browser extension corresponding to the policy at stage 430. Some policies can be based on the user's browsing history. In one example policy, if a user averages more than 3 tabs open in a web browser over a predetermined amount of time (e.g., a week or a month), then the ERE 148 can recommend a browser extension that reduces RAM utilization by unused tabs (e.g., TAB SUSPENDER). In another example policy, if the user regularly visits websites that are known for tracking users, such as shopping websites, then the ERE 148 can recommend an extension that prevents tracking (e.g., PRIVACY BADGER). In another example policy, if the user regularly visits websites known to have large amounts of advertisements, such as shopping sites, sports sites, and blogs, then the ERE 148 can recommend an extension that minimizes ads, thereby reducing bandwidth usage (e.g., ADBLOCK).

Some policies can be based on the user's location or the network that the user device 110 connects to. For example, the ERE 148 can create a risk profile from the browsing data based on factors like the physical location, the type of network the user device 110 connect to (e.g., open versus secure WI-FI and the type of security is used if connected to a secure network) and a risk level associated with the Internet Protocol ("IP") address. The risk profile can be based on the user, the user device 110, or both. In one example, the ERE 148 can retrieve a risk profile created by the UEM system 140 or provided by a third-party, such as CARBON BLACK. If the risk profile designates an elevated security risk based on the policy, then the ERE 148 can recommend an extension that can increase the security posture of the browser 130 (e.g., PRIVACY BADGER and HTTPS EVERYWHERE).

Some policies can be based on one or more groups in the enterprise that the user belongs to. In one example, groups can have their own policies related to browser extensions. As an example, users in a financial department can be required to extensions that add additional security to browsing and password protection (e.g., HTTPS EVERYWHERE and LASTPASS), and a sales department can require or recommend extensions for optimizing performance (e.g., TAB SUSPENDER). Some group-based recommendations can be based on extensions prominently used by other users belonging to a group. For example, the ERE 148 can identify any extensions used by a large portion of users in a group and recommend the extension to other members of that group.

Some policies can be based on frequently used web applications. For example, if a user frequently uses a particular web application, and that web application has a browser extension, then the ERE 148 can recommend that extension to the user. For example, ASANA is a project management web-based application that offers a browser extension called ASANA2GO. For a user that frequently uses ASANA, the ERE 148 can identify ASANA2GO as the corresponding extension and recommend it to the user.

In one example, the ERE 148 can recommend an extension based on other extensions used by the user. For example, if a user uses a particular set of extensions, the ERE 148 can compare that set to extensions used by other users. The ERE 148 can identify other extensions used by others that also use the set of the first user. If a threshold amount or percentage of the other users also use another extension, then the ERE 148 can recommend that extension to the user. As an example, the user can use the LASTPASS and HTTPS EVERYWHERE extensions. The ERE 148 can identify other users in the organization that also use LASTPASS and HTTPS EVERYWHERE and identify other extensions those users also use. In doing so, the ERE 148 can determine that most of those users also use the ADBLOCK extension, and so the ERE 148 can recommend the ADBLOCK extension to the user.

The ERE 148 can recommend internal extensions provided by the UEM system 140, third-party extensions, or both, depending on the example. In one example, an admin can select which extensions that the ERE 148 can recommend. In another example, the ERE 148 can apply an ML model to identify extensions. For example, the ML model can be trained to analyze third-party extension libraries 150 and identify extensions that may be useful to users based on browsing data. The ML model can do this by analyzing descriptions of the extensions provided in the extension library 150 using natural language processing ("NLP") techniques and mapping the descriptions to the user browsing data. In one example, if the ERE 148 identifies a new extension, the ERE 148 can notify an admin so that the admin can review the new extension and decided whether to approve it.

At stage 440, the ERE 148 can cause the browser 130 to install the browser extension. In an example, this can depend on the policy. For example, a policy can designate a browser extension as optional or mandatory. For example, if a policy dictates that the extension is mandatory, then the UEM system 140 can push an install to the browser 130. For example, if the browser 130 is a managed browser, then the managed browser 130 can be configured to allow for push installs of extensions. The UEM system 140 can send an install file of the corresponding extension to the managed browser 130 with instructions to install it. The UEM system 140 can also send instructions to prohibit use of the managed browser 130 if the extension is not installed. In one example, the management application 120 can receive the extension install file from the management server 140, and the management application 120 can instruct the managed browser 130 to install the extension. In an example where the browser 130 is not managed, the UEM extension 132 can be responsible for installing a required extension and enforcing noncompliance.

In an example where the extension is designated as optional, the ERE 148 can merely recommend the extension to the user. For example, the ERE 148 can cause a notification, message, or email to be sent to the user device 110 that identifies the recommended extension and provides a brief explanation of why the extension is recommended. As an example, if the user frequently has a large number of tabs open on the browser 130, then user can receive a message or notification that recommends the TAB SUSPENDER extension and explains that the extension will reduce memory usage and therefore increase the speed of the user device 110.

FIG. 5 is a sequence diagram of an example method for installing a recommended browser extension based on user behavior. At stage 502, the management application 120 can collect data related to the user device 110. In an example, the data related to the user device 110 can include data related to device posture, network connections, and location. In one example, the network information can include information related to the user's location and the types of networks the user device 110 connects to. For example, the network information can include how often the user connects to internal networks of the UEM system 140 versus external networks and the security protocols used by the external networks.

In an example, the management application 120 can send the data to the management server 142. For example, the management application 120 can compile the data as one or more data files, such as a JSON, Extensible Markup Language ("XML"), HTML, text, or other file type. The management application 120 can send the data file using a communication protocol like an HTTP or API call. Jumping ahead to stage 508, the management server 142 can send the ERE 148 or grant the ERE 148 access to the data. In an alternative example, the management application 120 can send the data directly to the ERE 148, thus negating the need for stage 508.

At stage 504, the UEM extension 132 can collect browsing data related to the user, and at stage 506, the forward proxy 134 can collect browsing data related to the user. In an example, only one of stages 504 and 506 occurs. For example, for an unmanaged browser 130, the UEM extension 132 can be installed thereon and collect the browsing data. Alternatively, for a managed browser 130, the forward proxy 134 can collect the browsing data. Stages 504 and 506 can both occur in examples where the user uses both a managed and unmanaged browser 130. For example, the user can use a managed browser 130 on one device and an unmanaged browser 130 on another.

Regardless of the browser configuration, the UEM extension 132 and forward proxy 134 can collect the same types of data and send the data to the management application 120. Examples of data collected by the UEM extension 132 and forward proxy 134 can relate to the user's browsing habits, such as the types of websites the user tends to visit, how many tabs the user tends to have open, and so on.

In an example, the UEM extension 132 and forward proxy 134 can send the data to the management server 142. For example, the UEM extension 132 and forward proxy 134 can compile the data as one or more data files, such as a JSON, Extensible Markup Language ("XML"), HTML, text, or other file type. The UEM extension 132 and forward proxy 134 can send the data file using a communication protocol like an HTTP or API call. At stage 508, the management server 142 can send the ERE 148 or grant the ERE 148 access to the data. In an alternative example, the UEM extension 132 and forward proxy 134 can send the data directly to the ERE 148, thus negating the need for stage 508.

At stage 510, the ERE 148 can compare the browsing data to extension policies. The way the ERE 148 compares the data can depend on the policy. For example, some policies can require that a certain extension be installed for certain users, and the ERE 148 can simply compare the user to the policy and determine whether the required extension is installed. For example, the ERE 148 can determine how frequently a user visits a particular website or type of website, how many tabs the user typically has open in the browser 130 when the browser 130 is open, how frequently the user connects using an unsecure network, and how much time the user spends using a particular web application. This statistical data can then be compared to the policies.

At stage 512, the ERE 148 can identify an extension based on the policy parameters. For example, if the browsing data falls within the parameters of a policy, then the ERE 148 can identify the corresponding extension for recommendation. Some policies can be based on the user's browsing history. For example, a policy can include a parameter for a maximum number of tabs open in the browser 130. For users that exceed the maximum number, the policy can designate a browser extension that limits the RAM utilized by unused tabs (e.g., TAB SUSPENDER). In another example, a policy can include a parameter for a maximum rate (i.e., number of visits to such websites over a period of time) at which a user visits websites that are known for tracking users, such as shopping websites. For users that exceed the maximum rate, the policy can designate an extension that prevents tracking (e.g., PRIVACY BADGER). In another example, a policy can include a parameter for a maximum rate at which a user visits websites known to have large amounts of advertisements, such as shopping sites, sports sites, and blogs. For users that exceed the maximum rate, the policy can designate an extension that minimizes ads, thereby reducing bandwidth usage (e.g., ADBLOCK).

Some policies can be based on the user's location or the network that the user device 110 connects to. For example, the ERE 148 can create a risk profile from the browsing data based on factors like the physical location, the type of network the user device 110 connect to (e.g., open versus secure WI-FI and the type of security is used if connected to a secure network) and a risk level associated with the Internet Protocol ("IP") address. The risk profile can be based on the user, the user device 110, or both. In one example, the ERE 148 can retrieve a risk profile created by the UEM system 140 or provided by a third-party, such as CARBON BLACK. If the risk profile designates an elevated security risk based on the policy, then the ERE 148 can recommend an extension that can increase the security posture of the browser 130 (e.g., PRIVACY BADGER and HTTPS EVERYWHERE).

Some policies can be based on one or more groups in the enterprise that the user belongs to. In one example, groups can have their own policies related to browser extensions. As an example, users in a financial department can be required to extensions that add additional security to browsing and password protection (e.g., HTTPS EVERYWHERE and LASTPASS), and a sales department can require or recommend extensions for optimizing performance (e.g., TAB SUSPENDER). Some group-based recommendations can be based on extensions prominently used by other users belonging to a group. For example, the ERE 148 can identify any extensions used by a large portion of users in a group and recommend the extension to other members of that group.

Some policies can be based on frequently used web applications. For example, if a user frequently uses a particular web application, and that web application has a browser extension, then the ERE 148 can recommend that extension to the user. For example, ASANA is a project management web-based application that offers a browser extension called ASANA2GO. For a user that frequently uses ASANA, the ERE 148 can identify ASANA2GO as the corresponding extension and recommend it to the user.

The ERE 148 can recommend internal extensions provided by the UEM system 140, third-party extensions, or both, depending on the example. In one example, an admin can select which extensions that the ERE 148 can recommend. In another example, the ERE 148 can apply a ML model to identify extensions. For example, the ML model can be trained to analyze third-party extension libraries 150 and identify extensions that may be useful to users based on browsing data. The ML model can do this by analyzing descriptions of the extensions provided in the extension library 150 using NLP techniques and mapping the descriptions to the user browsing data. In one example, if the ERE 148 identifies a new extension, the ERE 148 can notify an admin so that the admin can review the new extension and decided whether to approve it.

At stage 514, the ERE 148 can inform the management server 142 of an extension that should be installed on the browser 130 based on the comparison. In an example, the ERE 148 can also notify the management server 142 whether installation of the extension is required or optional. For example, if installation is optional, then the management server 142 can notify the user. For example, the management server 142 can send a notification, message, or email to the user device 110 that identifies the recommended extension and provides a brief explanation of why.

The remaining stages illustrate an example of when installation of the extension is required. At stage 516, the management server 142 can send instructions to the UEM extension 132 for installing the extension. This stage can occur when the user device 110 includes an unmanaged browser 130 that has the UEM extension 132 installed. Alternatively, the management server 142 can send the instructions to the management application 120, and the management application 120 can communicate with the UEM extension 132 to facilitate the installation of the extension. In examples where the browser 130 is managed, the management server 142 can send the instructions to the management application 120, and the management application 120 can communicate with the managed browser 130 to facilitate installation of the extension.

In an example, the instructions can include an install for file for the extension and instructions to install it. Alternatively, the instructions can include a URL for the extension that the browser 130 can use to retrieve the install file. In one example, based on the corresponding policy, the management server 142 can also send instructions to prohibit use of the browser 130 if the extension is not installed.

At stage 518, the UEM extension 132 or managed browser 130, depending on the example, can request the extension from the extension library 150. The extension library 150 can be internal to the UEM system 140 or a third-party, depending on the example. For example, GOOGLE CHROME, MICROSOFT EDGE, APPLE SAFARI, and MOZILLA FIREFOX all have their own extension library for their corresponding browsers. At stage 520, the extension library 150 can send an installation file for the extension to the user device 110.

At stage 522, the user device 110 can install the extension. In examples where the browser 130 is unmanaged, the UEM extension can instruct the unmanaged browser 130 to install the extension. In examples where the browser 130 is managed, the managed browser 130 can install the extension based on the received instructions.

Figure 6:
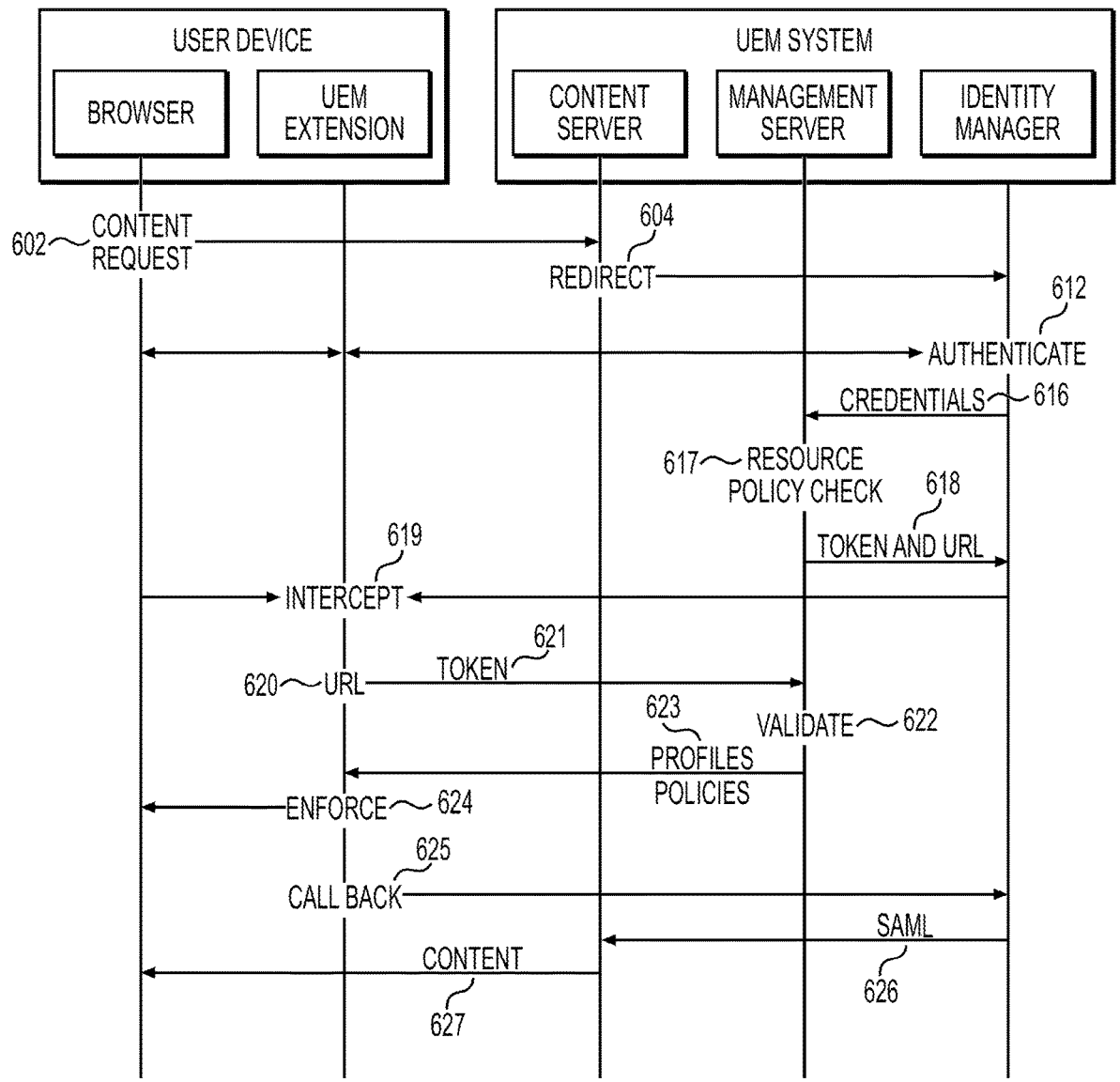
FIG. 6 is a sequence diagram of an example method for resource-specific policy enforcement using a managed extension with an unmanaged web browser.

FIG. 6 is a sequence diagram of an example method for resource-specific policy enforcement using a managed extension with an unmanaged web browser. In addition to ensuring that particular extensions are installed on an unmanaged browser 130, a managed extension can provide enhanced policy enforcement when a user attempts to access secure content with the browser 130. For example, the management server 142 can enforce data loss prevention ("DLP") policies by sending profiles and policies to a UEM extension 132 that includes capabilities for enforcing the policies on content accessed by the browser 130. Such policy enforcement has previously required a managed browser or management application. But in situations where users wish to use the browser 130 and device of their choice to access secure enterprise content, the UEM extension 132 can allow for this needed policy enforcement.

While accessing secure resources, the UEM extension 132 can act as a gatekeeper. Users can first be required to install the UEM extension 132, such as using the methods of FIGS. 4 and 5. The UEM extension 132 can then download user-specific and resource-specific profiles and compliance settings that get enforced at the browser during runtime. For example, an administrator can enable a copy and paste restriction for a particular webpage or enable a watermark for viewing the webpage. When the user attempts to access the webpage, the UEM extension 132 can intercept the content being loaded and apply these sorts of policies.

A detailed example is provided in FIG. 6. At stage 602, the browser 130 can request secure content from a content server 146. The secure content can be an enterprise resource. The content server 146 can redirect the request for authentication purposes at stage 604. For example, the content server 146 can begin a secure assertion markup language ("SAML") assertion and forward the request to an identity manager 144, like in stage 304 of FIG. 3. The identity manager 144 can then authenticate the user at stage 612, such as by following stages 306 through 312 of FIG. 3. This can include asking for user authentication information, which the user or UEM extension 132 can provide, and verifying those credentials.

When the user is authenticated, the identity manager 144 can send the user's credentials to the management server 142 at stage 616. At stage 617, the management server 142 can then determine whether resource-specific policies exist for the secure content and whether user-specific policies exist for that user. Resource-specific policies can include specific restrictions for the secure content or types of secure content. These can include functional restrictions that disable regular features of the browser or user device, such as printing, copying, screen capturing, or using other types of applications such as email while the secure content is displayed. User-specific policies similarly can enable and disable particular features and applications based on the user or a group to which the user belongs. As an example, a CEO may have the ability to copy text from the secure resource whereas a mail clerk does not. Similarly, compliance policies, such as whether the device can be jailbroken, can be user-specific. The management server can store profiles specific to users, user groups, secure content, and content groups. The secure content or respective group can be identified by either a document identifier or a URL, in an example.

When any such policy exists, the management server 142 can generate and send an access token to the identity manager 144 at stage 618 or directly to the UEM extension 132. The access token can allow the UEM extension 132 to communicate with the management server 144 for purposes of receiving the resource-specific and user-specific policies.

Stage 618 can include informing the identity manager 144 that user-specific or resource-specific profiles are found. In addition to the access token, the management server 144 can send a redirection URL for communicating with the UEM extension 132. This can allow the UEM extension 132 to intercept communications to the browser and obtain the access token.

At stage 619, the identity manager 144 can contact the browser 130, with the UEM extension 132 intercepting the communication. The interception can occur before the secure content is loaded on the page. The UEM extension 132 can decrypt a portion of the response from the identity manager 144 and understand next actions to take. For example, an encrypted payload can identify that the management server 142 has policies for use by the UEM extension 132. The UEM extension 132 can include certain certificates to decrypt the payload.

The UEM extension 132 can receive the redirect URL and the access token issued by the management server 142. In one example, the redirect URL is used by the UEM extension to know where to contact the management server 142 at stage 620. The UEM extension 132 can send the access token at stage 621 when contacting the management server 142. The management server 142 can then validate the access token at stage 622. For example, it can be compared against a paired version of the token that it kept, or information from the token can be used to look up the user profile.

At stage 623, the management server 142 can provide one or more profiles to the UEM extension 132. These profiles can include user-specific and resource-specific policies that exist for the user or secure content. The user-specific profile can have policies relating to the user, such as requiring that the user is enrolled in the UEM system in order to view content or geofencing properties that allow the user to access secure content from certain areas. The content-specific policies can be additional policies that relate to the particular content or type of content. The UEM extension 132 can then enforce the policies at the browser 130 at stage 624. In one example, this can include enabling or disabling particular functionality or restricting particular application usage prior to receiving the secure content. In general, the UEM extension 132 can enforce the policies and ensure that the user device 110 and browser 130 are compliant with the policies as a condition to accessing the secure content.

After determining that the browser 130 and device 110 are compliant, at stage 625 the UEM extension can call back to the identify manager 144 or content server 146. The URL extension can do this by utilizing a callback URL received from the identity manager 144 at stage 619, in an example. Alternatively, the callback URL can be received from the management server 142 as part of the profile download. Calling back can cause the identity manager 144 to complete the SAML assertion with the content server 146 at stage 626, authenticating the user with the content server 146. At stage 627, the content server 146 can then send the secure content to the UEM extension 132 or browser 130. With the resource-specific and/or user-specific policies being enforced, the browser 130 can load the secure content.

Figure 7:
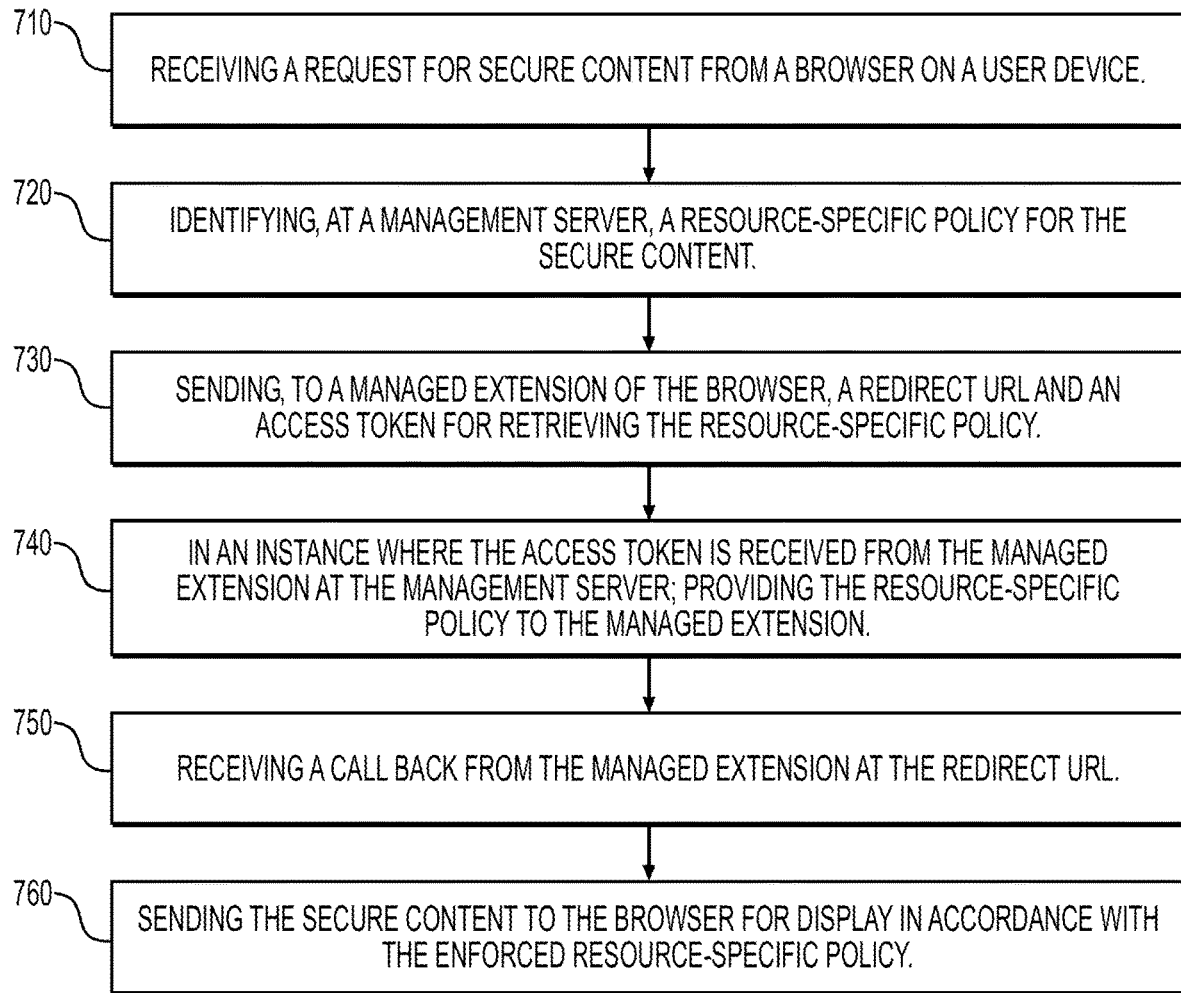
FIG. 7 is a flowchart of an example method for resource-specific policy enforcement using a managed extension with an unmanaged web browser.

FIG. 7 is a flowchart of an example method for resource-specific policy enforcement using a managed extension with an unmanaged web browser. Although a UEM extension 132 and UEM system 140 is discussed, the examples can apply to any type of managed extension and managed backend system. At stage 710, the UEM system 140 can receive a request for secure content from a browser 130 on a user device 110. The request can be sent to a content server 146 in one example. But the UEM system 140 can authenticate the user device 110 and ensure that the UEM extension 132 is enabled with the browser 130 making the request. For example, the UEM system 140 can follow the stages of FIG. 5 starting at stage 512 to ensure that the UEM extension 144 gets installed. The request for secure content can be redirected for purposes of user authentication at the management server 142.

At stage 720, the UEM system 140 can identify a resource-specific policy for the secure content. This can occur at the management server 142, such as after the request is redirected to the identity manager 144 or management server 142. The resource-specific policy can include functional enhancements or limitations to be enforced at the user device 110 while the secure content is loaded. This can include disabling certain features for security reasons, such as email, copy functions, or screen captures. The policies can also add functional enhancements, such as checking for the user's facial identification in periodic intervals to ensure the user is still controlling the device 110 that is displaying secure content.

At stage 730, the UEM system 140 can send a redirect URL and an access token to the UEM extension 132. The redirect URL can allow the UEM extension to contact the management server 144 for purposes of retrieving the resource-specific policy, in an example. Alternatively, or in addition, the redirect URL can allow the UEM extension to call back to the identity manager 144 once the resource-specific and user-specific policies are being enforced at the browser 130.

At stage 740, the UEM system 140 can provide the resource-specific policy to the UEM extension 132. This can be in response to receiving an access token that allows the management server 142 to validate the identity of the user or user device 110 and the validity of the UEM extension 132. A user-specific policy can also be provided to the UEM extension 132. One or more profiles with the policies can be provided as files or scripts that are executed by the UEM extension 132 to enforce the policies at the browser 130.

With at least a portion of the policies enforced, at stage 750 the UEM system 140 can receive a call back from the UEM extension 132 at the redirect URL. In response, at stage 760 the UEM system 140 can send the secure content to the browser 130 for display in accordance with the enforced resource-specific policy. For example, the content server 146 can send the secure content to the UEM extension 132. The UEM extension 132 can apply a policy by blocking display of portions of the secure content or by disabling particular functionality. Any such modifications are possible, depending on the policies, and can be applied prior to displaying the secure content on the browser 130.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for identifying a browser extension recommended for a user device, comprising:
   enrolling a user device to be managed by a management server by causing a management application to be installed on the user device, wherein the management server is configured to manage one or more applications, including a managed web browser, by sending instructions to the management application for enforcing compliance with security settings of the one or more applications, including the managed web browser;
   determining that the user device contains an unmanaged web browser that is not managed by the management server;
   causing a Unified Endpoint Management (UEM) extension to be installed on the unmanaged web browser on the user device, wherein the UEM extension is configured to collect browsing data of the unmanaged web browser;
   receiving the browsing data of the unmanaged web browser at the management server from the UEM extension on the user device, the browsing data corresponding to browsing habits of a user, wherein the browsing data includes website browsing history of the user of the user device;
   comparing the browsing data including the website browsing history of the user to parameters of a policy that governs which of a plurality of browser extensions are required for accessing secure content with the unmanaged web browser;
   based on the comparison, identifying a browser extension from the plurality that corresponds to the user's browsing habits; and
   sending, to the user device, instructions to install the identified browser extension on the unmanaged web browser.

2. The method of claim 1, wherein the browsing data further includes at least one of an average number of browser tabs the user has open in a web browser on the user device over a period of time, at least one category of a web site that the user accessed from the web browser, a risk profile associated with the user, information related to network connections made by the user device, location information of the user device, and one or more groups that the user belongs to.

3. The method of claim 1, wherein the instructions to install the identified browser extension include a Uniform Resource Locator ("URL") that the user device can use to retrieve an installation file of the identified browser extension.

4. The method of claim 1, further comprising:
   identifying one or more browser extensions installed on the unmanaged web browser of the user device;
   identifying a plurality of users within an organization whose web browsers have the one or more extensions installed;
   determining that a threshold percentage of the web browsers of the plurality of users have the one or more identified extensions installed; and
   sending, to the user device, a recommendation to install the one or more identified extensions.

5. The method of claim 1, wherein the policy designates the identified browser extension as mandatory or optional, and the method further comprises:
   in an instance where the identified browser extension is designated as mandatory, sending instructions to the user device to block network access if the identified browser extension is not installed.

6. The method of claim 5, further comprising:
   in an instance where the identified browser extension is designated as optional, sending a message to the user device recommending that the user install the identified browser extension.

7. The method of claim 1, further comprising:
   sending, from the management server to the UEM extension an install file for installing the identified browser extension on the unmanaged web browser.

8. A non-transitory, computer-readable medium containing instructions that, when executed by a hardware-based processor, causes the processor to perform stages for identifying a browser extension recommended for a user device, the stages comprising:
   enrolling a user device to be managed by a management server by causing a management application to be installed on the user device, wherein the management server is configured to manage one or more applications, including a managed web browser, by sending instructions to the management application for enforcing compliance with security settings of the one or more applications, including the managed web browser;
   determining that the user device contains an unmanaged web browser that is not managed by the management server;
   causing a Unified Endpoint Management (UEM) extension to be installed on the unmanaged web browser on the user device, wherein the UEM extension is configured to collect browsing data of the unmanaged web browser;
   receiving the browsing data of the unmanaged web browser at the management server from the UEM extension on the user device, the browsing data corresponding to browsing habits of a user, wherein the browsing data includes website browsing history of the user of the user device;
   comparing the browsing data including the website browsing history of the user to parameters of a policy that governs which of a plurality of browser extensions are required for accessing secure content with the unmanaged web browser;
   based on the comparison, identifying a browser extension from the plurality that corresponds to the user's browsing habits; and
   sending, to the user device, instructions to install the identified browser extension on the unmanaged web browser.

9. The non-transitory, computer-readable medium of claim 8, wherein the browsing data further includes at least one of an average number of browser tabs the user has open in a web browser on the user device over a period of time, at least one category of a web site that the user accessed from the web browser, a risk profile associated with the user, information related to network connections made by the user device, location information of the user device, and one or more groups that the user belongs to.

10. The non-transitory, computer-readable medium of claim 8, wherein the instructions to install the identified browser extension include a Uniform Resource Locator ("URL") that the user device can use to retrieve an installation file of the identified browser extension.

11. The non-transitory, computer-readable medium of claim 8, the stages further comprising:
   identifying one or more browser extensions installed on the unmanaged web browser of the user device;
   identifying a plurality of users within an organization whose web browsers have the one or more identified extensions installed;
   determining that a threshold percentage of the web browsers of the plurality of users have the one or more identified extensions installed; and
   sending, to the user device, a recommendation to install the one or more identified extensions.

12. The non-transitory, computer-readable medium of claim 8, wherein the policy designates the identified browser extension as mandatory or optional, and the method further comprises:
   in an instance where the identified browser extension is designated as mandatory, sending instructions to the user device to block network access if the identified browser extension is not installed.

13. The non-transitory, computer-readable medium of claim 12, the stages further comprising:
   in an instance where the identified browser extension is designated as optional, sending a message to the user device recommending that the user install the identified browser extension.

14. The non-transitory, computer-readable medium of claim 8, wherein the identified browser extension is provided by a third-party.

15. A system for identifying a browser extension recommended for a user device, comprising:
   a memory storage including a non-transitory, computer-readable medium comprising instructions; and
   a hardware-based processor that executes the instructions to carry out stages comprising:
     enrolling a user device to be managed by a management server by causing a management application to be installed on the user device, wherein the management server is configured to manage one or more applications, including a managed web browser, by sending instructions to the management application for enforcing compliance with security settings of the one or more applications, including the managed web browser;
     determining that the user device contains an unmanaged web browser that is not managed by the management server;
     causing a Unified Endpoint Management (UEM) extension to be installed on the unmanaged web browser on the user device, wherein the UEM extension is configured to collect browsing data of the unmanaged web browser;
     receiving the browsing data of the unmanaged web browser at the management server from the UEM extension on the user device, the browsing data corresponding to browsing habits of a user, wherein the browsing data includes website browsing history of the user of the user device;
     comparing the browsing data including the website browsing history of the user to parameters of a policy that governs which of a plurality of browser extensions are required for accessing secure content with the unmanaged web browser;
     based on the comparison, identifying a browser extension from the plurality that corresponds to the user's browsing habits; and
     sending, to the user device, instructions to install the identified browser extension on the unmanaged web browser.

16. The system of claim 15, wherein the browsing data further includes at least one of an average number of browser tabs the user has open in a web browser on the user device over a period of time, at least one category of a web site that the user accessed from the web browser, a risk profile associated with the user, information related to network connections made by the user device, location information of the user device, and one or more groups that the user belongs to.

17. The system of claim 15, wherein the instructions to install the identified browser extension include a Uniform Resource Locator ("URL") that the user device can use to retrieve an installation file of the identified browser extension.

18. The system of claim 15, the stages further comprising:
   identifying one or more browser extensions installed on the unmanaged web browser of the user device;
   identifying a plurality of users within an organization whose web browsers have the one or more identified extensions installed;
   determining that a threshold percentage of the web browsers of the plurality of users have the one or more identified extensions installed; and
   sending, to the user device, a recommendation to install the one or more identified extensions.

19. The system of claim 15, wherein the policy designates the identified browser extension as mandatory or optional, and the stages further comprise:
   in an instance where the identified browser extension is designated as mandatory, sending instructions to the user device to block network access if the identified browser extension is not installed.

20. The system of claim 19, the stages further comprising:
   in an instance where the identified browser extension is designated as optional, sending a message to the user device recommending that the user install the identified browser extension.

* * * * *